(12) United States Patent
Hunt

(10) Patent No.: US 8,059,239 B2
(45) Date of Patent: Nov. 15, 2011

(54) TRANSFLECTIVE LIQUID CRYSTAL DISPLAY

(75) Inventor: Alexander Hunt, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 174 days.

(21) Appl. No.: 12/333,537

(22) Filed: Dec. 12, 2008

(65) Prior Publication Data

US 2010/0149469 A1  Jun. 17, 2010

(51) Int. Cl.
*G02F 1/1333* (2006.01)
(52) U.S. Cl. ........................ 349/114
(58) Field of Classification Search ................ 349/114
See application file for complete search history.

(56) References Cited

U.S. PATENT DOCUMENTS

| | | | |
|---|---|---|---|
| 5,867,297 A | 2/1999 | Kiang et al. | |
| 6,008,871 A * | 12/1999 | Okumura | 349/61 |
| 6,317,532 B1 | 11/2001 | Lin et al. | |
| 2005/0094066 A1* | 5/2005 | Brindel | 349/114 |
| 2008/0117151 A1 | 5/2008 | Nurmi et al. | |

FOREIGN PATENT DOCUMENTS

WO    WO 2004/013687 A1    2/2004

OTHER PUBLICATIONS

International Search Report, corresponding to PCT/EP2009/057330, mailed on Mar. 10, 2010.
Written Opinion of the International Searching Authority, corresponding to PCT/EP2009/057330, mailed on Mar. 10, 2010.

* cited by examiner

*Primary Examiner* — Phu Vu
(74) *Attorney, Agent, or Firm* — Renner, Otto, Boisselle & Sklar, LLP (57) ABSTRACT

The present invention describes a display comprising a liquid crystal layer, an illumination system and a reflective layer, where the reflective layer is arranged below the liquid crystal layer, where the reflectivity of the layer is adjustable. In this way the amount of ambient light passing through the display and being reflected by the reflective layer can be altered. Moreover, the present invention describes a method and computer program for controlling reflectivity of a flat display panel in a portable electronic device.

17 Claims, 4 Drawing Sheets

TRANSFLECTIVE LIQUID CRYSTAL DISPLAY

TECHNICAL FIELD

The present invention is related to displays for portable electronic devices. More specifically it is related to transflective (partly reflective and partly transmissive) liquid crystal displays used in these devices.

BACKGROUND ART

Electronic devices with FDP (Flat Panel Displays) based on different technologies, such as PDP (Plasma Display Panel) and LCD (Liquid Crystal Display) have existed for a number of years on the market now. While offering superior sharpness and level of detail compared to previously existing cathode ray tubes there is a constant need to reduce their power consumption in portable electronic devices. Mainly the power consumption of FDP displays stems from their backlight function used in order to illumine the display when it is used in unfavourable lighting conditions.

In recent years, electronic devices with displays using so called OLED (Organic Light Emitting Display) have appeared on the market eliminating the need of a backlight function and, under special circumstances, possibly also the power consumption of such a display. However, the cost of OLED displays is still higher than that of LCD displays with backlight and at the same time OLED displays may show signs of colour shifting with time. Thus, LCD-based FDP displays will probably still remain the dominant display technology on the market for some time.

Now regarding LCD displays In low lighting conditions which typically occur indoors, a display with high brightness and contrast is desirable, i.e. a fully transmissive display. On the other hand, it is also desirable to have a display that is clearly visible in bright light as well.

Since so far these requirements have been in conflict, design engineers have developed displays which provide a compromise between fully transmissive and fully reflective displays offering satisfactory brightness and contrast in most lighting conditions.

Therefore, the selection of display for an electronic device has been influenced by the lighting conditions in which the display was to be used.

Handheld electronic devices are normally used in all possible lighting conditions. Hence there is a need to develop a display for portable electronic devices which provide good brightness and contrast in all lighting conditions.

SUMMARY OF THE INVENTION

According to one aspect of the present invention, the above need is met by a display for a portable electronic device, where the display comprises a liquid crystal layer adapted for presenting information on the display; an illumination system for regulating the amount of light supplied to the liquid crystal layer and a reflective layer below the liquid crystal layer, wherein the reflectivity of the layer is adjustable such that the amount of ambient light passing through the display and being reflected by the reflective layer is adjustable.

The advantage of using a reflective layer with adjustable reflectivity is the ability to achieve high reflectivity in good lighting conditions and low reflectivity (or high transmissivity) of the display when the display is used in low light conditions. In this fashion valuable battery time consumed by the backlight system may be saved in good lighting conditions sacrificing very little of the readability of the display. On the other hand, good readability of the display is also achieved in low lighting conditions.

In one embodiment of the display according to the present invention the reflectivity of the reflective layer may be electrically adjustable.

Especially, the reflective layer may comprise mirrors whose reflectivity is electrically adjustable by controlling their position via a first control signal.

In a further embodiment, the display according to the present invention may comprise a light sensor which may detect the ambient light level impinging onto the display, such that the first control signal is dependent on the detected ambient light level. In this way, the reflectivity of the display may be automatically adjusted.

However, in a further embodiment of the display, the first control signal affecting the reflectivity of the reflective layer may be controlled by a user. Additionally, the amount of light supplied to the liquid crystal layer by the illumination system may be controlled by a second control signal dependent on the first control signal.

In yet another embodiment of the display according to the present invention, the reflective layer may be arranged between the liquid crystal layer and the illumination system. Also, the liquid crystal layer and the illumination system may each are arranged in planes parallel to each other whereby the reflective layer may be arranged in a first plane parallel to the planes of the liquid crystal layer and the illumination system.

In a first variant of the embodiment of the display where the reflective layer comprises mirrors, the mirrors may be extendable between a first position and at least one second position in a direction of the first plane. The first position may then comprise a fully contracted position of the mirrors, while the at least one second position may comprise a fully extended position of the mirrors.

In a second variant of the embodiment of the display where the reflective layer comprises mirrors, the mirrors may be unfoldable between a first position and at least one second position in a direction of the first plane. In this case the first position may comprises a fully folded position of the mirrors, while the at least one second position may comprises a fully unfolded position of the mirrors.

Each of the mirrors in the reflective layer may be controlled by a MEMS (Microelectromechanical System) engine, adapted to move the mirrors between the first and at the at least one second position.

However, the reflective layer may also comprise electrically controllable polarizing elements arranged in a first plane parallel with the liquid crystal layer and the illumination system. These polarizing elements may be controlled by a MEMS engine adapted to move the polarizing elements between a first and at least a second position in the first plane. In this fashion more than one mirror or groups of mirrors may be controlled by one single MEMS engine.

One other aspect of the present invention is related to a portable electronic device comprising a display with a liquid crystal layer adapted for presenting information on the display and an illumination system for regulating the amount of light passing through the liquid crystal layer. Moreover, the portable electronic device comprises a control unit configured to control the illumination system by means of a second control signal, where the display of the portable electronic device further comprises a reflective layer below the liquid crystal layer, wherein the reflectivity of the layer is electrically controllable by the control unit via a first control signal.

In this fashion the portable electronic device may under all lighting conditions present a well-readable display to a user.

In one embodiment of the portable electronic device, the portable electronic device is equipped with a light sensor adapted to detect the amount of ambient light impinging onto the display.

In a further embodiment the portable electronic device may comprise a processing unit adapted to compare the amount of ambient light detected by the light sensor with one or more threshold values and to instruct the control unit to transmit a first control signal to the reflective layer. Also, the processing unit may be further adapted to instruct the control unit to transmit a second control signal to the illumination system depending on the first control signal. In this fashion a first control signal altering the reflectivity of the reflective layer in the display may lead to altering of the light intensity produced by the backlight system of the display, such that higher reflectivity values lead to lower light intensity values for the backlight system.

Yet another aspect of the present invention is related to a method for controlling reflectivity of a flat panel display in a portable electronic device comprising the steps of receiving an input signal indicative of the level of ambient light impinging onto the flat panel display; comparing the received input signal with one or more threshold values indicative of different lighting conditions, transmitting a first control signal dependent on the comparison to a reflective layer in the flat panel display and controlling the reflectivity of the reflective layer in the flat panel display by means of the first control signal.

Moreover, another aspect of the present invention is related to a computer program for controlling reflectivity of a reflective layer in an electronic display comprising instruction sets for executing the method steps described earlier.

The invention will be better understood through the study of the following detailed description together with the accompanying drawings.

DETAILED DESCRIPTION

Figure 1:
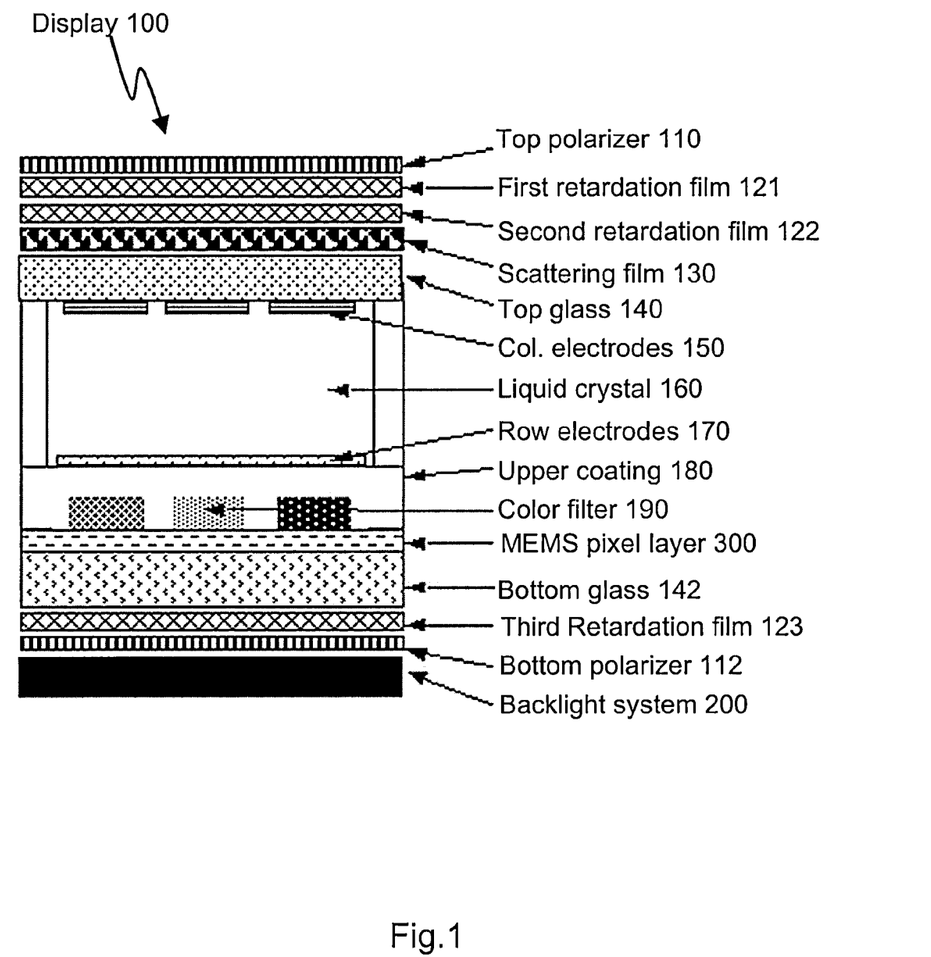
FIG. 1 illustrates a display comprising the reflective layer according to one embodiment of the present invention.

FIG. 1 illustrates a display 100 comprising a MEMS (Microelectromechanical Systems) pixel layer according to one embodiment of the present invention.

The example embodiment shown in FIG. 1 is related to a standard LCD display used in a portable electronic device. However, it should be mentioned that the use of the present invention in connection with an LCD display is only exemplary and should not be conceived as limited to exclusively this application. In fact, present invention may be used together with any other display technology having a backlight function and which uses control signals to project an image onto a display surface Therefore, the present invention may be used with displays using LCD, PDP and other technologies using a backlight system to illumine the display.

As seen from FIG. 1, the display according to the present invention comprises a number of layers stacked on top of each other. It should be mentioned that the display in the figure is not drawn up to scale, i.e. the thickness of the different layers may not exactly correspond to a display used in a real-life scenario.

Starting from the top, the display according to the present invention comprises a top polarizer 110, a first and a second retardation film 121, 122, a scattering film 130, a top glass 140, column electrodes 150, a liquid crystal layer 160, row electrodes 170, an upper coating 180 and a color filter. It should be pointed out here that the components with the reference numbers 110-190 are known in the art. Their description will therefore be kept short. Moreover, the display 100 further comprises a MEMS pixel layer 300 below the layers 110-190.

Additionally, the display 100 in FIG. 1 further comprises a bottom glass 142, a third retardation film 123, a bottom polarizer 112 and a backlight system 200. Here it is worth mentioning that the layers 142, 123, 112 and 200 below the MEMS pixel layer are known technology.

As known from basic LCD technology, the top and bottom polarizers 110 and 112 are usually arranged perpendicularly to each other, such that light passing through the top polarizer 110 is blocked by the bottom polarizer 112. Moreover, the function of the retardation films 121, 122, 123 is to provide for a black and white color on the display by eliminating elliptically polarized components from the light passing through the liquid crystal layer 160. These elliptically polarized light components emerge when light passes the liquid crystal layer 160 due to the internal twisted molecular structure of the liquid crystal layer 160.

Regarding the scattering film 130, its role is to scatter the light passing through the bottom polarizer 112 all the way through the top glass layer 140 in order to increase the viewing angle for the LCD display.

Additionally, the role of the top and bottom glass layers 140, 142 is the protection of the liquid crystal layer 160 while at the same time the provision of transparency, such that light from the backlight system 200 can pass unhindered to the liquid crystal layer 160.

Further the display 100 comprises a layer of column electrodes 150 and row electrodes 170 whose surface is in contact with the liquid crystal layer. Once a voltage is applied across the electrodes a typically twisted helical structure of the liquid crystal molecules is altered, such that the molecules align themselves parallel to the electric field. Depending on the degree of "untwisting" which is dependent on the strength of the electric field, light passing through the top polarizer 110, the liquid crystal layer 160 is more or less hindered from passing through both polarizers 110, 112. Together with the color filter 190 which the light is passing through this will result in different nuances of the colors red, green and blue—the colors of subpixels contained in the color filter 190. These different colors in the color filter 190 are schematically illustrated by the three rectangles in the color filter 190 filled with different patterns.

A more detailed description of the function of each of the layers 110-190 and 200 above is not necessary, since it is sufficiently known to the skilled person.

Now the difference between the display 100 according to the present invention and a conventional LCD display is the presence of the MEMS pixel layer 300 comprising MEMS mirrors, i.e. mirrors in the micrometer size range whose position may be altered either by means of electrostatic forces or by means of a micrometer-sized electromotor.

Here it should be pointed out that each MEMS mirror in the MEMS pixel layer 300 corresponds to one subpixel of the LCD display 100. Also, each of the MEMS mirrors in the MEMS pixel layer 300 can be either controlled by a separate electrical control signal or groups of MEMS mirrors or all MEMS mirrors may be controlled by one common control signal.

As can be seen from the example in FIG. 1, the MEMS pixel layer 300 is located between the color filter 190 and the bottom glass 142. However, in other embodiments the MEMS pixel layer may be located in any position between the backlight system 200 and the color filter 190. Placement of the MEMS pixel layer 300 below the color filter 190 will safeguard that light from the backlight system 200 or incident light passing through the layers above the MEMS pixel layer will be displayed as colored light.

One main advantage of the MEMS pixel layer is the ability to control the amount of light that is reflected by the MEMS mirrors from the environmental or incident light passing through the top polarizer 110, the liquid crystal layer 160 and the color filter 190. This can be achieved by using electrostatic forces or electromotors on a micrometer scale to change the position of the MEMS mirrors either from a vertical to a horizontal position or from one horizontal position to another horizontal position in the plane of the MEMS pixel layer.

This way, the reflectivity of the display 100 can be effectively controlled.

Figure 3:
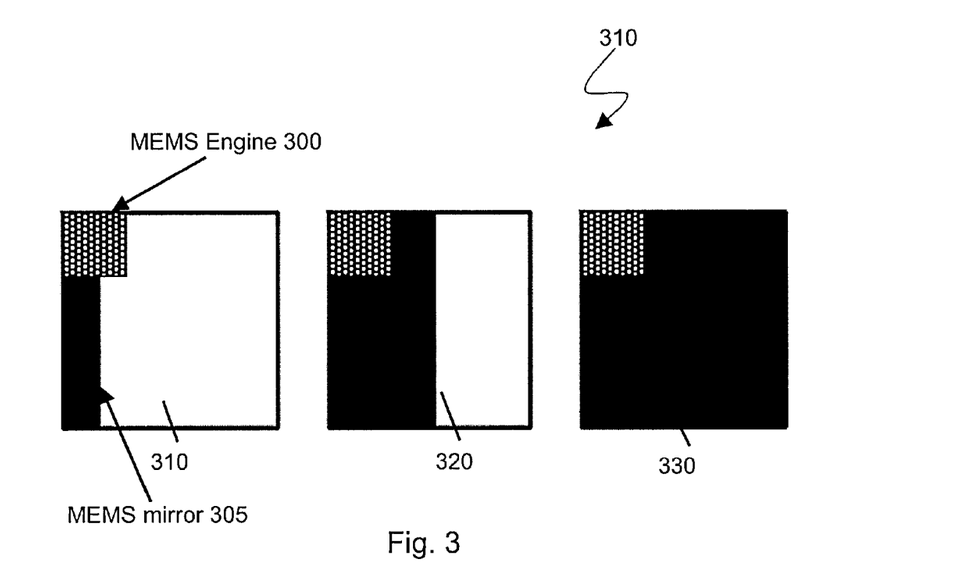
FIG. 3 illustrates one embodiment of the reflective layer according to the present invention.

In FIG. 3 this will be explained more in detail.

Another advantage of a MEMS pixel layer comprising MEMS mirrors is the ability to control the amount of light passing from the backlight system 200 through the bottom polarizer 112, the color filter 190, the liquid crystal layer 160 and the top polarizer 110. Thus, the MEMS pixel layer 300 is able to affect the transmissivity of the display 100. Since the transmissivity and the reflectivity of the display are dependent on each other, the backlight function may be reduced in lighting conditions allowing a more or less reflectivity MEMS pixel layer 300.

It should be pointed out here that the use of a MEMS pixel layer whose reflectivity can be adapted to the environing lighting conditions is only one example embodiment of the present invention. It may be equally possible to use a layer comprising NEMS (Nanometer Electrical Microstructures) mirrors or to use a layer comprising a material whose reflectivity can be altered by means of an electrical signal. The main point here is to use a reflective layer with a reflectivity that can be adapted to environing lighting conditions.

Figure 2:
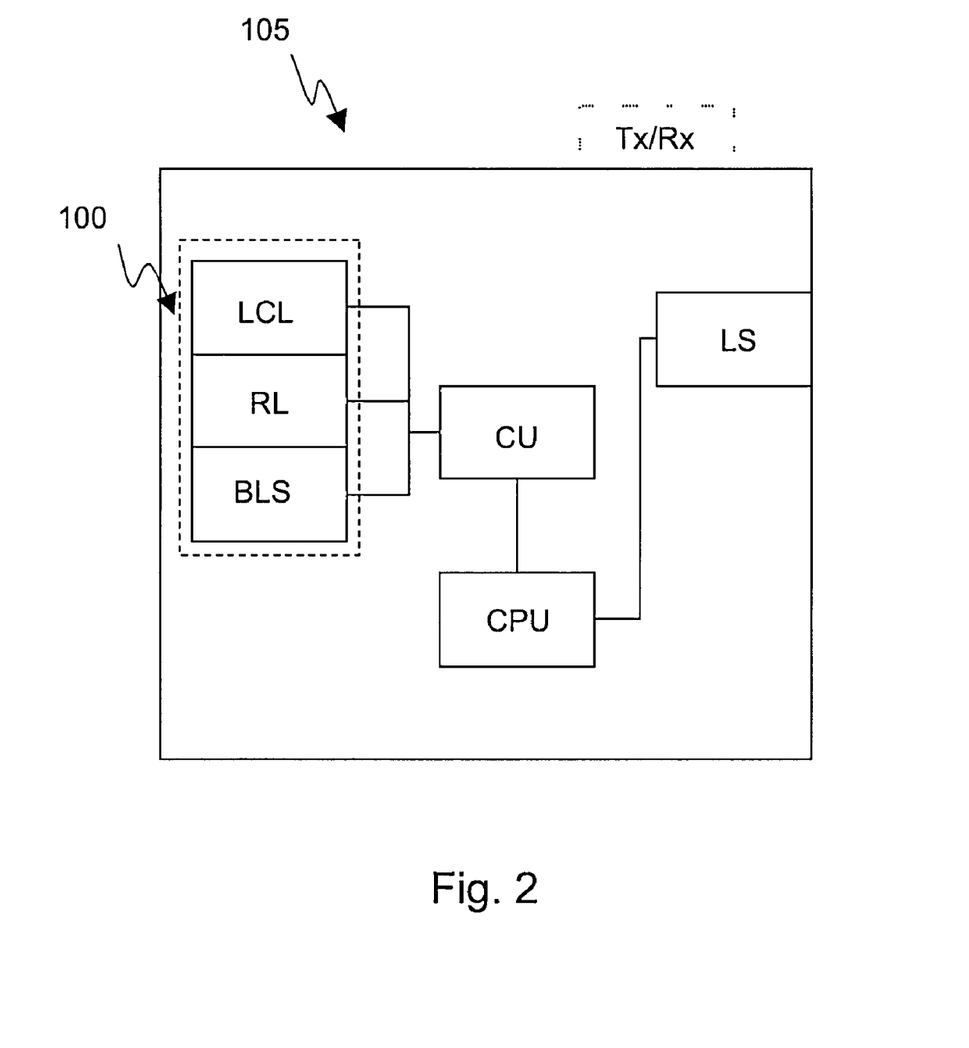
FIG. 2 illustrates a portable electronic device using the display according to one embodiment of the present invention.

FIG. 2 is a schematic presentation of a portable electronic device 105 using the display 100 from FIG. 1.

As can be seen from the figure, the portable electronic device comprises the display 100 with a liquid crystal layer LDL, a reflective layer RL and a backlight system BL. As is evident from FIG. 1, the display 100 comprises more than these three layers, but the remaining layers have been omitted in order to avoid unnecessary repetition and increase readability. Each of the three layers of the display 100 are connected to a control unit CU. The main task of the control unit is to transmit control signals to the display 100 in order to make graphics and text visible on it. As explained earlier in FIG. 1, one of these control signals may be an LCL control signal in the form of a voltage applied across the column and row electrodes arranged above and below the liquid crystal layer LDL forcing the molecules of the liquid crystal layer LCL to realign themselves along the electrical field between the electrodes. Together with the top and bottom polarizers described earlier more or less shaded areas are created on the display surface. Moreover, the control unit CU is adapted to transmit a first control signal in the form of a voltage or a current to the reflective layer RL in order to make it more or less reflective for the light passing through the LCL and coming from the outer environment and at the same more or less transparent for the light from the backlight system BLS. Also, the control unit CU is also adapted to control the amount of light produced by the backlight system BLS by means of a second control signal. This second control signal can be made dependent on the first control signal, such that changing reflectivity of the reflective layer RL affects the intensity of the light produced by the backlight system BLS. Thus, for example if the first control signal instructs the reflective layer to increase intensity to 50%, the second control signal may at the same time instruct the backlight system BLS to decrease its light intensity by 50%. In another example, if the control signal instructs the reflective layer RL to increase its reflectivity to 100%, the second control signal may switch of the backlight system BLS.

Additionally, the portable electronic device 105 comprises a central processing unit CPU, which among the task usually performed by a processing unit in any portable electronic device is adapted to receive an input signal from a light sensor LS and convert the input signal into a corresponding light intensity value. This light intensity value corresponds to the amount of light impinging on the display 100. In this embodiment of the electronic device, the light sensor LS is placed outside of the display area. However, it would be equally possible to place the light sensor in the display 100.

Now the processing unit CPU is adapted to compare the converted input signal with one or more threshold values indicative of different lighting conditions which the electronic device may encounter. Depending on the lighting condition determined from the comparison between the converted input signal and the one or more threshold values the processing unit CPU may then instruct the control unit CU to transmit a first and possibly second control signal to the display 100 in order make the reflective layer RL adjust the reflectivity to the lighting condition determined during the comparison step above and to make the backlight system BLS adjust the light intensity to depending on the reflectivity of the reflective layer RL.

In addition, the portable electronic device 105 may also comprise a transmitter/receiver-combination Tx/Rx adapted to communicate in one or more mobile or wireless communication networks. Since, portable electronic devices with wireless communication facility are well-known, the receiver/transmitter-combination Tx/Rx will not be elaborated further.

FIG. 3 illustrates one embodiment of a MEMS mirror 305 in the MEMS pixel layer according to the present invention.

Here, it is assumed that one MEMS mirror 305 corresponds to one subpixel of the display from FIG. 1. Moreover, the MEMS mirror 305 in FIG. 2 may be extended from an initial position 310 towards the half extended position 320 and the fully extended position 330. Likewise, the MEMS mirror 305 may also be retracted from any of the positions 310-330 towards one of the previous positions 310, 320.

While the initial position 310 may represent more or less complete transmissivity of the display from FIG. 1 where essentially all light form the backlight system passes through the MEMS pixel layer in FIG. 2 and reaches the display surface, the second half-extended position 320 of the MEMS mirror 305 creates a situation where the display is essentially 50% transmissive and essentially 50% reflective. Thus about 50% of the light incident on the display and passing through the different layers of the display down to the MEMS pixel layer is reflected back by the MEMS pixel layer.

Additionally, the third fully extended position 330 of the MEMS mirror 305 makes for a fully reflective display, since no essentially no light is able to pass through the MEMS pixel layer 300. In this case essentially all light incident on the display is reflected back by the MEMS pixel layer.

It may added here that the in a first variant the MEMS mirror 305 may be foldable and extendable in the form of a fan, while in a second variant the MEMS mirror 305 may comprise two or more MEMS mirrors stacked on top of each other, where the uppermost mirror is not movable, while the underlying mirrors underneath the top mirror may be telescopically extended parallel to a plane in which the top mirror is located.

Figure 4:
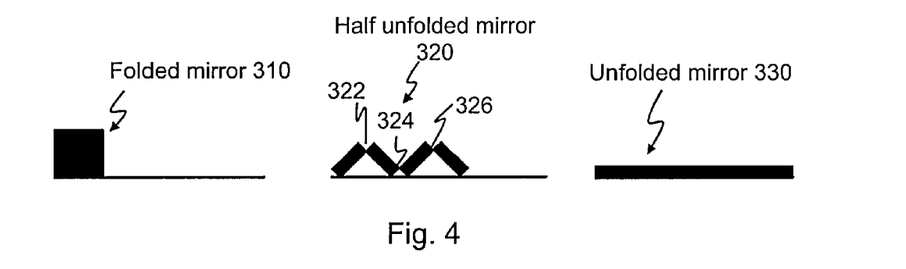
FIG. 4 illustrates one variant of the MEMS pixel layer according to a first embodiment of the present invention.
Figure 5:
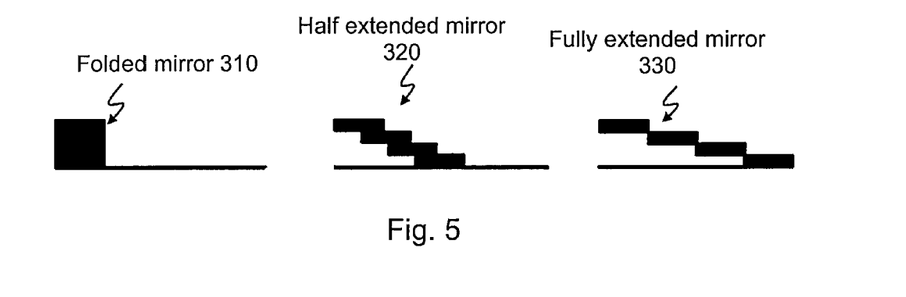
FIG. 5 illustrates another variant of the MEMS pixel layer according to a second embodiment of the present invention.

This is illustrated more in detail in FIGS. 4 and 5.

Also, in this embodiment it is assumed that each MEMS mirror comprises its own MEMS engine 300 which has the function of controlling the movement of the MEMS mirror 305 by an electric control signal. However, as mentioned earlier, more than one MEMS mirror 305 may be controlled by a single MEMS engine 300. The electric control signal may either extend the foldable mirror 305 by electrostatic means or by means of a micrometer-sized electro-motor. Also, the extension of the foldable mirror may be effectuated by any other suitable means provided it is initiated by an electrical control signal.

Moreover, the electric control signal may be dependent on the level of detected ambient light or the level of incident light impinging onto the display in FIG. 1. A more detailed description of the mechanism of controlling the movement of MEMS mirrors will be given in FIG. 6.

FIG. 4 illustrates one variant of a MEMS mirror used in the MEMS pixel layer of FIG. 1.

As can be seen from FIG. 4, the MEMS mirror in this variant comprises four sub MEMS-mirrors folded in the initial position 310 seen on the left side of FIG. 4 where the transmissivity of the display from FIG. 1 is essentially 100%. In the middle half-unfolded position, the MEMS mirrors are partly unfolded making the display essentially 50% transmissive and 50% reflective. In this case, the power of the backlight system may be reduced by 50%. In the fully unfolded position 330 the MEMS mirrors are 100% reflective reflecting all light that has passed through the display down to the MEMS pixel layer. At the same time essentially no light from the backlight system in FIG. 1 passes through the MEMS pixel layer. Therefore, in the unfolded mirror position 330 the backlight can be safely switched off. In this way, the MEMS pixel layer comprising folded mirror according to FIG. 4 can save precious battery power in a portable electronic device.

Moreover, the horizontal line in FIG. 4 represents the plane in which the folded mirror is located. It will be in the direction parallel to the plane that the mirror in FIG. 4 will be unfolded. It should also be pointed out that the plane in FIG. 4 is parallel to the planes in which the remaining layers of the display shown in FIG. 1 are located.

Regarding the folding and unfolding of the MEMS mirror from FIG. 4, it may be for example effectuated by means of electrostatic actuators which move the folded mirror from the position 310 into the positions 320 and 330. Another possibility is the extension of the folded mirror in FIG. 4 by a micrometer-sized electromotor which can move the mirrors apart by means of a piston which is moved in a direction parallel to the plane in which the folded mirror is located. The details of the mechanism for actuating the mirrors will not be elaborated here, since they are considered sufficiently known to the skilled person. It suffices to say that the MEMS mirrors in FIG. 4 may be connected to each other at the points 322, 324 and 326 around which they are pivotable. In this fashion the MEMS mirrors can be made to fold into the position 310 and unfolded into the positions 320 and 330.

FIG. 5 illustrates another embodiment of a MEMS mirror making up the MEMS mirror layer in FIG. 1. Here, instead of being foldable in the form of a fan, the MEMS mirrors may be stacked on top of each other and extended and retracted telescopically as shown in the figure.

Starting from a folded position 310, where all mirrors are parallel and stacked on top of each other, the MEMS mirrors may be telescopically extended to the half-extended position 320 and the fully extended position 330. Since the change of reflectivity for the MEMS mirror in FIG. 5 functions in the same fashion as for the MEMS mirrors in FIG. 4 this will not be explained further.

Also, the telescopic extension and retraction of the MEMS mirrors may be effectuated by electrostatic actuators or by electromotors moving the mirrors apart.

One main difference between the MEMS mirror variants described in FIGS. 4 and 5 is that the thickness of the MEMS mirror layer in FIG. 1 would be increased somewhat when using the variant in FIG. 4 compared to the one in FIG. 5. On the other hand, the variant in FIG. 4 may be technically easier to achieve.

One way to achieve the telescopic movement of the MEMS mirrors in a direction parallel to the plane of the MEMS pixel layer may be to arrange each mirror on microscopic rails. Then by using an electrostatic actuator the mirrors may be moved from the folded position 310 into the fully extended position 330.

Figure 6:
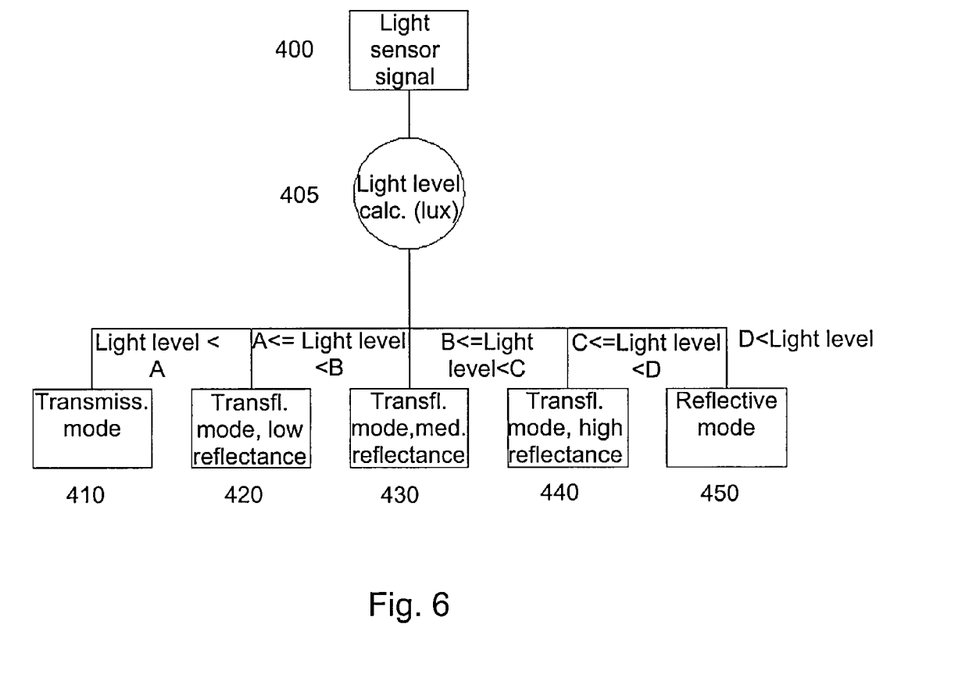
FIG. 6 illustrates one embodiment of a method according to the present invention.

FIG. 6 illustrates one embodiment of a method according to the present invention, where the reflectance of the MEMS-layer in a display of an electronic device is adjusted depending on an input signal received at a light sensor of the electronic device.

At step 400 a portable electronic device comprising a display according to the invention receives an input signal indicative of the level of ambient light or of the level of light incident on the display of the device. This light sensor may either be located in the vicinity of the display or on the display surface itself.

In this case, one possible position for the light sensor may be essentially in the middle of the display.

At step 405 a processing unit in the electronic device calculates from the light sensor signal received a corresponding light level. This calculated value corresponds to the level of light impinging onto the display. Moreover, at step 405 the detected light level is compared to a number of threshold values If at step 405 the processing unit detects that the light level is lower than a first threshold value A, the control unit is instructed to send at step 410 control signals to the display switching it into fully transmissive mode. The first threshold value A may be set to correspond to low light level conditions, such as a weak incandescent lighting. A could for example be set anywhere between 0-500 lux.

Sending a first mirror control signal to the MEMS mirrors in the MEMS pixel layer to return to their folded position as depicted in FIG. 2 and a second backlight control signal to the backlighting function of the display instructing it to be switched on the control unit may affect this change. However, the backlighting function may be turned on to full power or be dependent on the light level calculated. As is known, in very low light conditions, such as in the presence of only stray light the human eye may perceive a display as fully readable even when the backlighting function is running at low power.

However, if at step 405 the processing unit has determined that the light level calculated is higher or equal than the first threshold value A and lower than a second threshold value B, the processing unit instructs at step 420 the control unit to send a second mirror control signal to the MEMS mirrors. By means of the second mirror control signal the MEMS mirrors in the MEMS pixel layer are instructed to fold out into a position corresponding to a transflective mode with low reflectance, where for example the reflectance of the MEMS pixel layer is 10% while the transmissivity of the display is 90%. In this context the control unit may also instruct the backlight system by means of a second backlight control signal to reduce the amount of power used by 10% from a maximum power value.

The second threshold value B may correspond to a low light scenario with incandescent or other light with of somewhat higher intensity than in the case at step 410. B may for example then be set to a value between 700-1000 lux. If on the other hand, the processing unit at step 405 has determined that the calculated light level is higher or equal than a second threshold value B but less than a third threshold value C, it instructs the control unit to transmit a third mirror control signal to the MEMS mirrors instructing them to fold out into a transflective mode with medium reflectance, where for instance the display is 50% transmissive and 50% reflective. This would correspond to the half-unfolded position of the MEMS mirror in FIG. 2.

The third threshold value C may be set to correspond to indoor lighting conditions with strong incandescent or other artificial lighting or to outdoor lighting conditions of a cloudy day. Thus, C may be set to a value between 7000-10000 lux.

At the same time, the control unit may transmit a third backlight control signal instructing the backlighting function to reduce its output power by for example 50%. This would lead to a substantial saving of precious battery time on the portable electronic device using a display according to the present invention.

Additionally, if the processing unit at step 405 has determined that the calculated light level from the light sensor signal is higher that the third threshold value C but lower than a fourth threshold value D, it may at step 440 instruct the control unit to transmit a fourth mirror control signal to the MEMS mirrors.

This fourth mirror control signal has the effect that the MEMS mirrors are unfolded even more into a transflective mode with a high reflectance, such that the display is 80% reflective and 20% transmissive.

Such a fourth threshold value D may be set to correspond to outdoor and partly cloudy lighting conditions with no incident sunlight onto the display. In such a case, D may be set to a value between 30000-70000 lux.

Even in this case, the control unit may transmit a fourth backlight control signal to the backlight system instructing it to decrease its output power by 80% leading to a substantial saving of battery time for the portable electronic device.

Finally, if the processing unit at step 405 detects that the calculated light level is higher than the fourth threshold value D, it instructs at step 450 the control unit to transmit a fifth mirror control signal to the MEMS mirrors in the MEMS pixel layer, which leads to a complete unfolding of the MEMS mirrors and sets them into a purely reflective mode. In such a case, the reflectivity of the display is 100% and its transmissivity essentially zero.

This situation may correspond to incident sunlight onto the display.

It may also be added that the processing unit may check the status of the MEMS mirrors in the MEMS pixel layer (folded or unfolded) before sending out control signals to the MEMS mirrors at steps 410-450. Using this check the processing unit may establish whether to instruct the control unit to issue a control signal or not at steps 410 and 405. It may well be that the MEMS mirrors are already fully retracted when they display should be put into a 100% transmissive mode or fully extended when the display should be put into a fully reflective mode. In these two cases, issuing a first or fifth mirror control signal is not necessary. Also, in cases where the MEMS mirrors already are extended to some degree, the mirror control signals issued by the control unit may instruct the MEMS mirrors to retract into the position providing the needed reflectance.

Additionally, it may be mentioned that the method described in FIG. 6 may be reduced to only the situations 410 and 450, i.e. a fully transmissive display with the reflective layer having 0% reflectivity or a fully reflective display with the reflective layer having 100% reflectivity as desired.

Moreover, it may be pointed out that the embodiment of a method according to the present invention described in FIG. 6 is especially suited to be implemented by a computer program comprising instruction sets for executing the method steps 400-450.

It may also be mentioned that while the above embodiments show specific examples of the present invention, the spirit and scope of the invention is ultimately only limited by the accompanying patent claims.

The invention claimed is:

1. A display for a portable electronic device, the display comprising:
   a liquid crystal layer adapted for presenting information on the display;
   an illumination system for regulating the amount of light supplied to the liquid crystal layer;
   wherein
   the display further comprises a reflective layer below the liquid crystal layer, wherein the reflectivity of the layer is electrically adjustable such that the amount of ambient light passing through the display and being reflected by the reflective layer is adjustable and;
   wherein the reflective layer further comprises mirrors, wherein the reflectivity of the display is electrically adjustable by controlling position of the mirrors via a first control signal such that the display is reflective for ambient light and transmissive for light from the illumination system at the same time, and wherein the reflective layer further comprises electrically controllable polarizing elements arranged in a first plane parallel with the liquid crystal layer and the illumination system.

2. Display according to claim 1, further comprising a light sensor for detecting the ambient light level impinging onto the display, such that the first control signal is dependent on the detected ambient light level.

3. Display according to claim 1, wherein the first control signal is user controlled.

4. Display according to claim 1, wherein the amount of light supplied to the liquid crystal layer by the illumination system is controlled by a second control signal dependent on the first control signal.

5. Display according to claim 1, wherein the reflective layer is arranged between the liquid crystal layer and the illumination system.

6. Display according to claim 1, wherein the liquid crystal layer and the illumination system each are arranged in planes parallel to each other and wherein the reflective layer is arranged in a first plane parallel to the planes of the liquid crystal layer and the illumination system.

7. Display according to claim 6, wherein the mirrors are extendable between a first position and at least one second position in a direction of the first plane.

8. Display according to claim 7, wherein the first position comprises a fully contracted position, while the at least one second position comprises a fully extended position.

9. Display according to claim 6, wherein the mirrors are unfoldable between a first position and at least one second position in a direction of the first plane.

10. Display according to claim 9, wherein the first position comprises a fully folded position, while the at least one second position comprises a fully unfolded position.

11. Display according to claim 7, wherein each mirror is controlled by a MEMS (Microelectromechanical System) engine, adapted to move the mirrors between the first and at the at least one second position.

12. Display according to claim 1, wherein the polarizing elements are controlled by a MEMS engine adapted to move the polarizing elements between a first and at least a second position in the first plane.

13. Portable electronic device comprising:
  a display comprising a liquid crystal layer adapted for presenting information on the display;
  an illumination system for regulating the amount of light passing through the liquid crystal layer and;
  a control unit configured to control the illumination system by means of a second control signal,
wherein
  the display further comprises a reflective layer below the liquid crystal layer, wherein the reflectivity of the layer is electrically controllable by the control unit via a first control signal,
wherein
  the reflective layer further comprises mirrors and electrically controllable polarizing elements, the electrically controllable polarizing elements being arranged in a first plane parallel with the liquid crystal layer and the illumination system, wherein the reflectivity of the display is electrically adjustable by controlling position of the mirrors via the first control signal, such that the display is reflective for ambient light and transmissive for light from the illumination system at the same time.

14. Portable electronic device according to claim 13, wherein the portable electronic device further comprises a light sensor adapted to detect the amount of ambient light impinging onto the display.

15. Portable electronic device according to claim 14, further comprising a processing unit adapted to compare the amount of ambient light detected by the light sensor with one or more threshold values and to instruct the control unit to transmit a first control signal to the reflective layer.

16. Portable electronic device according to claim 15, wherein the processing unit is further adapted to instruct the control unit to transmit a second control signal to the illumination system depending on the first control signal.

17. Display according to claim 9, wherein each mirror is controlled by a MEMS (Microelectromechanical System) engine, adapted to move the mirrors between the first and at the at least one second position.

* * * * *